(12) United States Patent
Nakahara

(10) Patent No.: US 7,515,201 B2
(45) Date of Patent: Apr. 7, 2009

(54) FOCUS DETECTION METHOD AND FOCUS DETECTION APPARATUS

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 538 days.

(21) Appl. No.: 11/152,064

(22) Filed: Jun. 15, 2005

(65) Prior Publication Data

US 2005/0280734 A1    Dec. 22, 2005

(30) Foreign Application Priority Data

Jun. 16, 2004    (JP)    ............................. 2004-178726

(51) Int. Cl.
    *H04N 5/232*    (2006.01)
(52) U.S. Cl. ...................................... 348/354; 348/356
(58) Field of Classification Search ................. 348/345, 348/349, 353, 354, 356, 355
    See application file for complete search history.

(56) References Cited

U.S. PATENT DOCUMENTS

| | | | |
|---|---|---|---|
| 7,268,817 B2 * | 9/2007 | Lee et al. ..................... | 348/355 |
| 2001/0035910 A1 * | 11/2001 | Yukawa et al. .............. | 348/349 |
| 2004/0202461 A1 | 10/2004 | Nakahara | |

FOREIGN PATENT DOCUMENTS

JP    2001-249267    9/2001

OTHER PUBLICATIONS

English language Abstract of JP 2001-249267. Sep. 14, 2001.
U.S. Appl. No. 11/152,065 to Nakahara filed Jun. 15, 2005.

* cited by examiner

*Primary Examiner*—David L Ometz
*Assistant Examiner*—Dillon Durnford-Geszvain
(74) *Attorney, Agent, or Firm*—Greenblum & Bernstein, P.L.C.

(57) ABSTRACT

A focus detection apparatus includes a lens drive mechanism for moving a focusing lens group, and a controller for detecting a contrast value of the object image and moving the focusing lens group. The controller calculates a difference between maximum and minimum contrast values detected at the different positions of the focusing lens group; compares contrast values at two adjacent lens positions to determine whether the contrast value increases successively and subsequently decreases successively; detects a maximum contrast value, if the contrast value increases successively and subsequently decreases successively; calculates the maximum contrast value via a point of intersection between straight lines of two linear approximation expressions if the difference is equal to or greater than a predetermined value; calculates the maximum contrast value from a quadratic approximation expression, if the difference is smaller than the predetermined value.

9 Claims, 12 Drawing Sheets

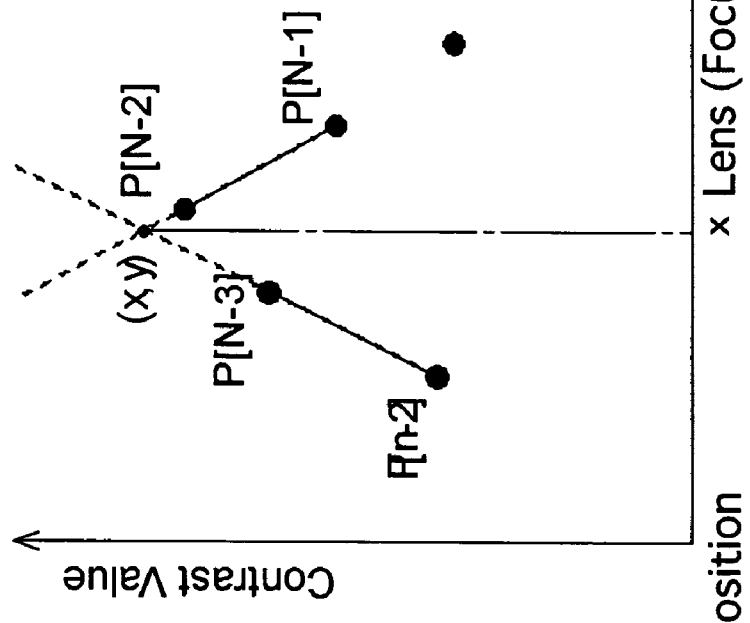
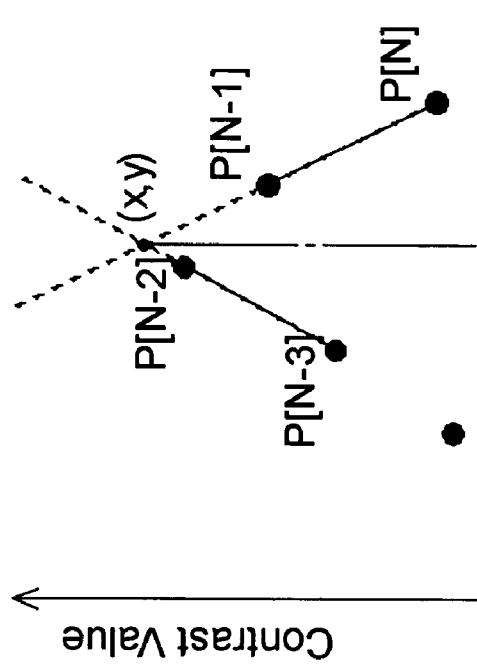
Fig. 7A
Fig. 7B

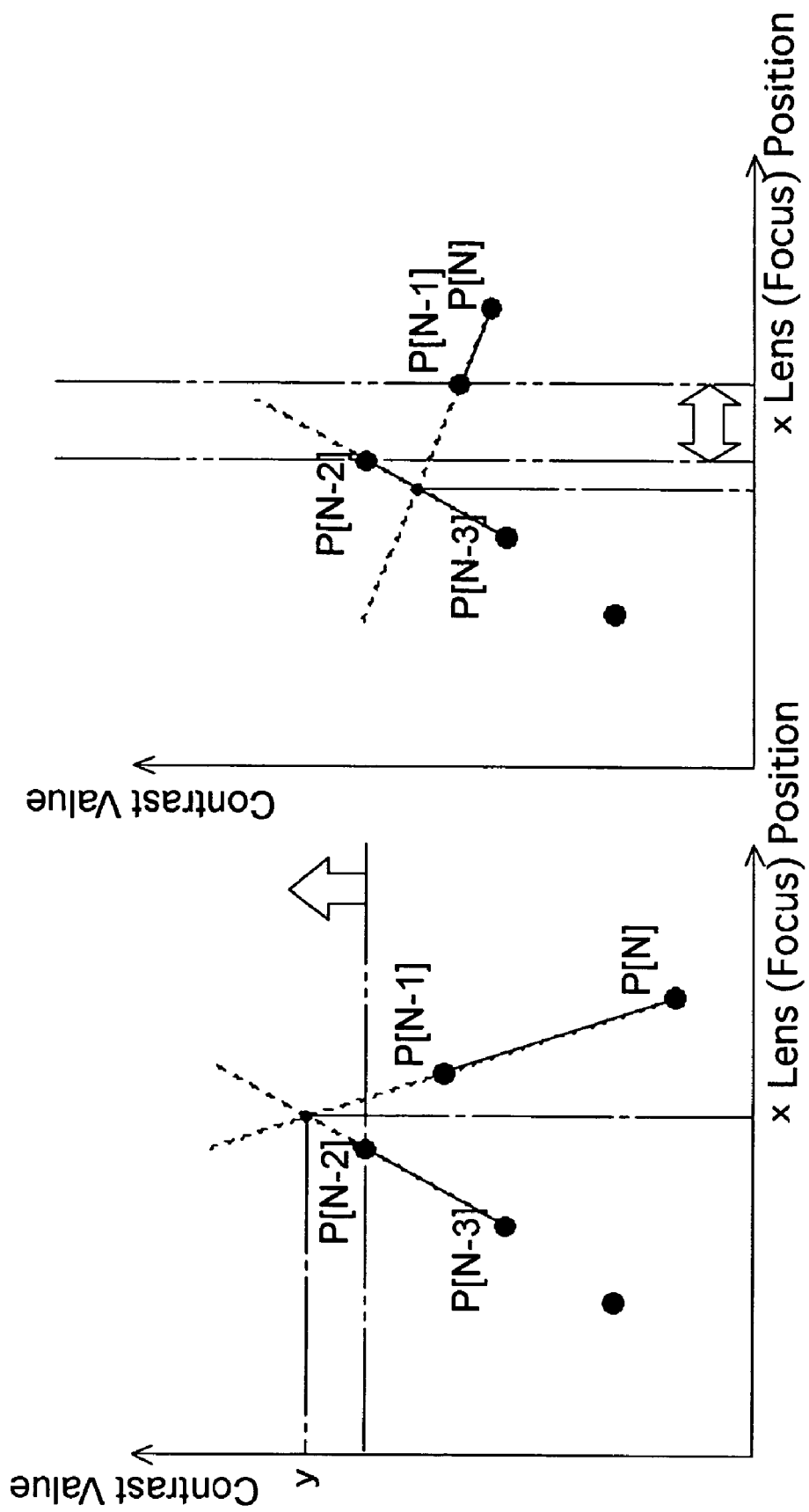

FOCUS DETECTION METHOD AND FOCUS DETECTION APPARATUS

BACKGROUND OF THE INVENTION

1. Field of the Invention

The present invention relates to a focus detection method and a focus detection apparatus of a digital camera.

2. Description of the Related Art

A contrast detection method is known as a conventional focus detection method for compact AF digital cameras. Conventional focus detection apparatuses using the contrast detection method operate to determine the position of a focusing lens group in which contrast of an object image captured by an image pickup device becomes maximum. Therefore, in such conventional focus detection apparatuses, an imaging operation is performed while a focusing lens group is driven stepwise from the infinite focus position (position for bringing an object at infinity into focus) to the closest (shortest) focus position to obtain a contrast from a captured image signal at each different position of the focusing lens group, and it is determined that a peak value of contrast among the obtained contrasts corresponds to a focused focal point, so that the focusing lens group is driven to a position thereof where the peak value of contrast is obtained to bring the object into focus. Such a focus detection apparatus is disclosed in, e.g., Japanese Unexamined Patent Publication No.2001-249267.

In the contrast detection method, a difference in contrast which is obtained by moving the focusing lens group in the optical axis direction is small in the case of a low-contrast object. Nevertheless, in the conventional contrast detection method, the reliability of the detected peak value of contrast is low because a reversal point where either the contrast (contrast value) of a captured image commences to decrease after increasing more than once (see FIG. 13A), or the contrast of a captured image commences to decrease more than once after increasing (see FIGS. 13B and 13C), or because only one of the number of successive increments of the number of successive decrements is counted to detect a peak value of contrast.

SUMMARY OF THE INVENTION

The present invention has been devised in view of the aforementioned problems which reside in conventional focus detection apparatuses adopting a contrast detection method, and provides a focus detection method for calculating a peak value of contrast via an algorithm, according to the level of contrast of an object image to thereby make it possible to perform a focus detecting operation with a high degree of precision regardless of contrast level. The present invention further provides a focus detection apparatus adopting such a focus detection method.

According to the present invention, even a low-contrast object can be brought into focus with precision because a more precise peak value of contrast (i.e., a focused focal point) is calculated by linear approximation in the case of a high-contrast object, and because a more precise peak value of contrast (i.e., a focused focal point) is calculated by quadratic approximation expression in the case of a low-contrast object.

According to an aspect of the present invention, a focus detection apparatus is provided, for detecting a focus state of an object image in accordance with a contrast of the object image, the focus detection apparatus including a lens drive mechanism for moving a focusing lens group of a photographing lens system within a predetermined range of movement; and a controller for detecting a contrast value of the object image at each of different positions of the focusing lens group and moving the focusing lens group via the lens drive mechanism in a direction from one to the other of opposite ends of the range of movement of the focusing lens group. The controller calculates a difference between a maximum contrast value and a minimum contrast value among the contrast values detected at the different positions of the focusing lens group. The controller compares contrast values at two adjacent lens positions of the focusing lens group successively at consecutive lens positions of the focusing lens group, in the direction from the one end to the other end of the range of movement of the focusing lens group, to determine whether the contrast value increases successively a predetermined number of times and subsequently decreases successively a predetermined number of times. The controller detects a maximum contrast value in the case it is determined that the contrast value increases successively the predetermined number of times and subsequently decreases successively the predetermined number of times. The controller calculates the maximum contrast value by calculating a point of intersection between straight lines of two linear approximation expressions in the case where the difference is one of equal to and greater than a predetermined value, one of the two straight lines passing through points of at least two adjacent contrast values on one of opposite sides of the maximum contrast value, the other of the two straight lines passing through points of at least another two adjacent contrast values on the other of the opposite sides of the maximum contrast value. The controller calculates the maximum contrast value from a maximum value of a quadratic approximation expression which passes through a plurality of contrast values including the maximum contrast value in the case where the difference is smaller than the predetermined value.

It is desirable for the controller to compare the calculated maximum contrast value with the detected maximum contrast value to determine whether the calculated maximum contrast value is greater than the detected maximum contrast value, and if the controller determines that the calculated maximum contrast value is greater than the detected maximum contrast value the controller determines that a position of the focusing lens group where the calculated maximum contrast value is obtained corresponds to a focused focal point, and moves the focusing lens group to the position of the focusing lens group.

It is desirable for the controller to determine a greater contrast value between the detected maximum contrast value and the calculated maximum contrast value as a maximum contrast value corresponding to a focused focal point.

It is desirable for the focusing lens group to be moved stepwise via the lens drive mechanism when the lens drive mechanism is driven by a motor.

It is desirable for the contrast of the object image to be measured by an image pickup device.

In an embodiment, a focus detection method is provided, for detecting a focus state of an object image in accordance with a contrast of the object image, the focus detection method including detecting a contrast value of the object image at each of different positions of a focusing lens group within a predetermined range of movement while moving the focusing lens group in a direction from one to the other of opposite ends of the range of movement of the focusing lens group; calculating a difference between a maximum contrast value and a minimum contrast value among the contrast values detected at the different positions of the focusing lens group; comparing contrast values at two adjacent lens positions of the focusing lens group with each other successively at consecutive lens positions of the focusing lens group in the direction from the one end to the other end of the range of movement of the focusing lens group to determine whether the contrast value increases successively a predetermined number of times and subsequently decreases successively a predetermined number of times; detecting a maximum contrast value in the case where it is determined that the contrast value increases successively the predetermined number of times and subsequently decreases successively the predetermined number of times; calculating the maximum contrast value by calculating a point of intersection between straight lines of two linear approximation expressions in the case where the difference is one of equal to and greater than a predetermined value, one of the two straight lines passing through points of at least two adjacent contrast values on one of opposite sides of the maximum contrast value, the other of the two straight lines passing through points of at least another two adjacent contrast values on the other of the opposite sides of the maximum contrast value; and calculating the maximum contrast value from a maximum value of a quadratic approximation expression which passes through a plurality of contrast values including the maximum contrast value in the case where the difference is smaller than the predetermined value.

It is desirable for the focus detection method to include comparing the calculated maximum contrast value with the detected maximum contrast value to determine whether the calculated maximum contrast value is greater than the detected maximum contrast value; and determining that a position of the focusing lens group where the calculated maximum contrast value is obtained corresponds to a focused focal point, and moves the focusing lens group to the position of the focusing lens group, wherein, in the case where it is determined that the calculated maximum contrast value is greater than the detected maximum contrast value.

It is desirable for the focus detection method to include determining a greater contrast value between the detected maximum contrast value and the calculated maximum contrast value as a maximum contrast value corresponding to a focused focal point.

It is desirable for the focus detection method to include moving the focusing lens group stepwise via a lens drive mechanism when the lens drive mechanism is driven by a motor.

The present disclosure relates to subject matter contained in Japanese Patent Application No. 2004-178726 (filed on Jun. 16, 2004) which is expressly incorporated herein by reference in its entirety.

BRIEF DESCRIPTION OF THE DRAWINGS

The present invention will be described below in detail with reference to the accompanying drawings in which:

FIGS. 7A through 7D are graphs each illustrating the linear approximation of a peak value of contrast in the case of a normal-contrast object;

DESCRIPTION OF THE PREFERRED EMBODIMENT

Figure 1:
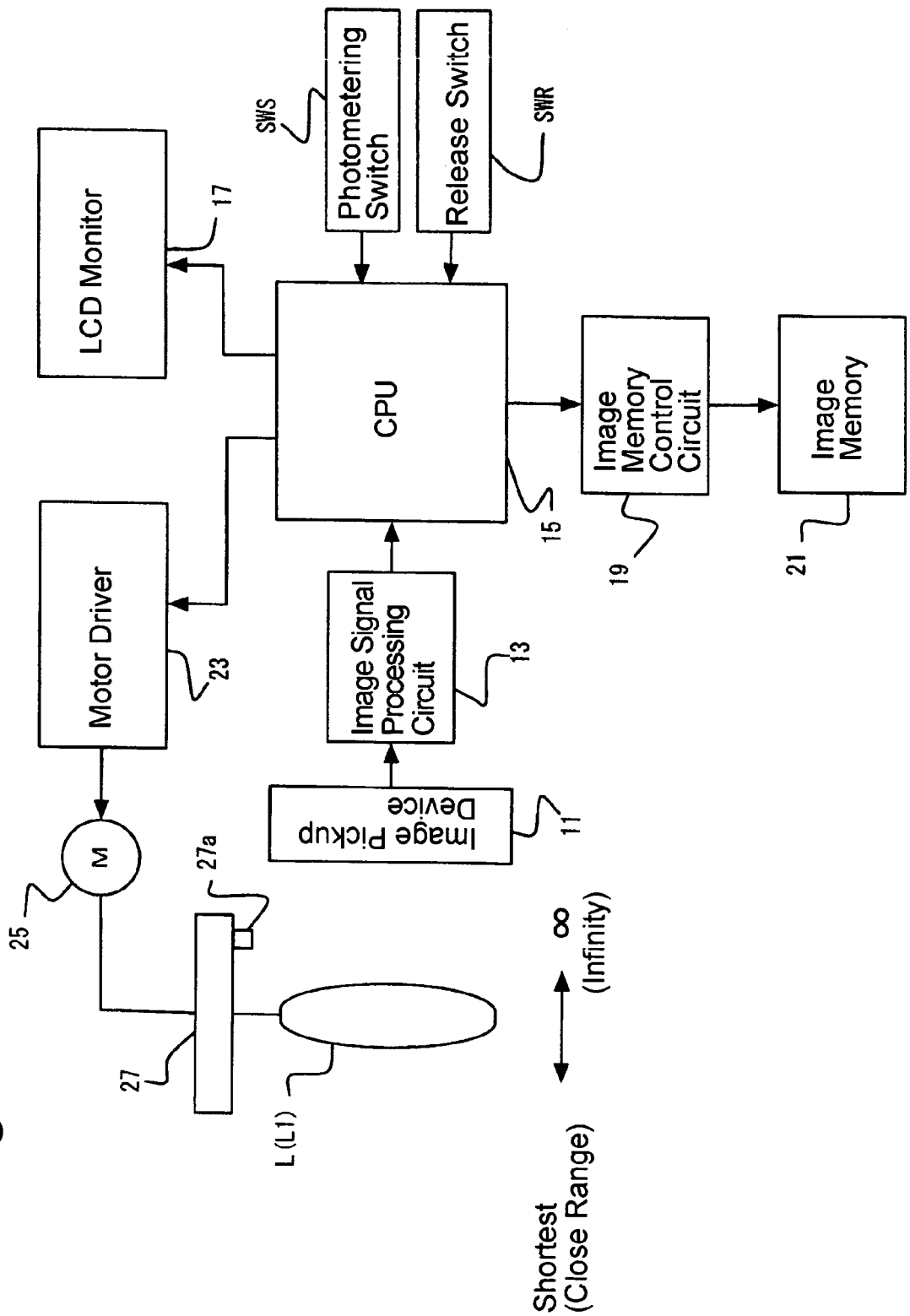
FIG. 1 is a block diagram of an embodiment of a digital camera to which the present invention is applied, showing a basic configuration of the digital camera.

FIG. 1 is a block diagram of an embodiment of a digital camera to which the present invention is applied.

The digital camera is provided with a photographing lens L including a focusing lens group L1, and an image pickup device (CCD image sensor) 11 serving as an imaging device. An object image is formed on a light receiving surface 12 (see FIG. 2) of the image pickup device 11 via the photographing lens L. The image pickup device 11 includes a large number of pixels (photoelectronic transducing elements) arranged in a two-dimensional matrix at predetermined intervals. The digital camera is further provided with an image signal processing circuit 13, a CPU (controller) 15, an LCD monitor 17, an image memory control circuit 19, an image memory 21, a motor driver 23, an AF motor 25 and a lens drive mechanism 27. Each pixel of the image pickup device 11 converts the incident light of an object image thereon into an electrical charge, and the electrical charges is accumulated (integrated). Upon completion of an exposure, the accumulated charges are output, pixel by pixel, as an image signal to the image signal processing circuit 13. The image signal processing circuit 13 performs predetermined adjusting processes such as a while-balance adjusting process and an A/D converting process on the input image signal to output digital image data to the CPU 15. Namely, predetermined processes are performed on the input image signal in the image signal processing circuit 13, and the image data which is digitized into pixel data is output to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19.

Figure 2:
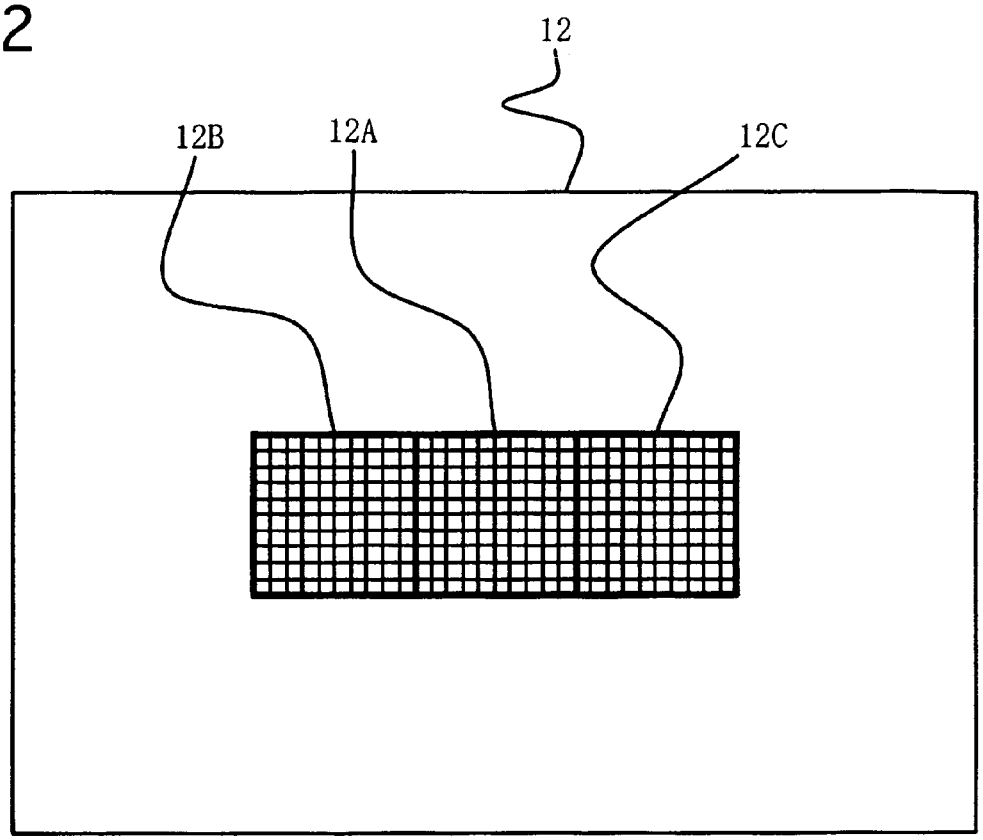
FIG. 2 is a diagrammatic illustration showing the relative position between a light receiving surface of an image pickup device and three focus detection areas on the light receiving surface in the digital camera shown in FIG. 1.
Figure 3:
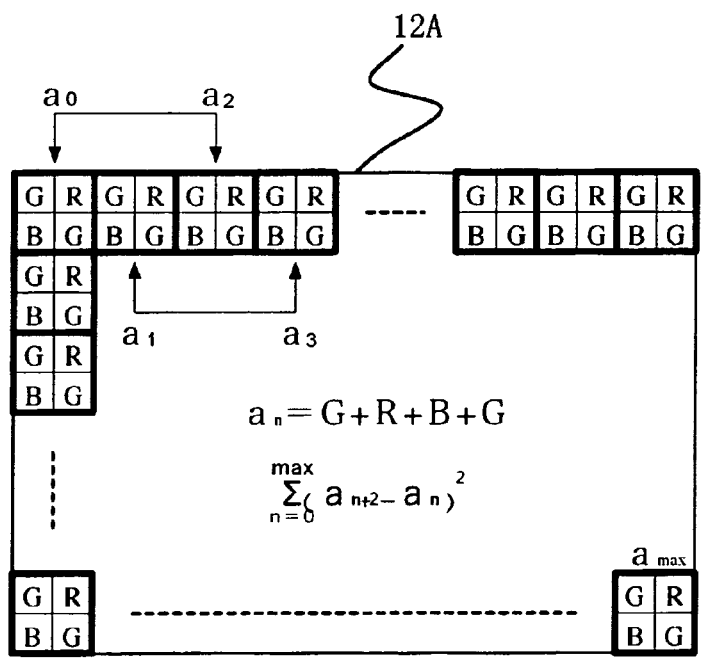
FIG. 3 is a diagrammatic illustration showing the relative position between the central focus detection area of the image pickup device and an array of pixels arranged thereon.

FIG. 2 shows the relative position between the light receiving surface 12 of the image pickup device 11 and three focus detection areas 12A, 12B and 12C on the light receiving surface 12 by way of example. FIG. 3 is an enlarged view of the central focus detection area 12A. Each of the remaining two focus detection areas 12B and 12C has the same structure as the central focus detection area 12A, and accordingly, only the central focus detection area 12A is shown in FIG. 3. The central focus detection area 12A is positioned at substantially the center of the light receiving area 12, while the remaining two focus detection areas 12B and 12C are positioned on laterally opposite sides of the central focus detection area 12A. Primary-color filters (red (R), green (G) and blue (B) filters) are disposed in front of each pixel (photoelectronic transducing element) on the object side thereof, and each pixel on the light receiving surface 12 transducers red, green and blue components of the incident rays of object light that are passed through the primary-color filters into electrical charges, and the electrical charges are accumulated. The electrical charges thus accumulated for a predetermined period of time are read out of the image pickup device 11 pixel by pixel to be output as an image signal.

FIG. 3 shows a conventional arrangement of primary-color filters. The primary-color filters include horizontal GR lines, in each of which green filters and red filters are horizontally arranged in alternative order, and horizontal BG lines, in each of which blue filters and green filters are horizontally arranged in alternative order, so that the GR lines and the BG lines are vertically arranged in alternative order. In the illustrated embodiment of the digital camera, four pixels (a 2 by 2 matrix of pixels) in each square, namely, a combination of two green filters, a red filter and a blue filter is treated as one pixel block, and the sum of the magnitudes of image signals integrated by the four pixels in each pixel block is regarded as intensity $a_n$ ($a_n$=G+R+B+G).

On the top of that, an operation for determining the difference between the intensity $a_n$ of a pixel block and the intensity $a_n$ of another pixel block positioned one pixel block away from the previous pixel block in the horizontal direction is repeated successively in the horizontally rightward direction within the focus detection area 12A while the differences thus determined ($a_{n+2}-a_n$) are added up. Upon completion of such difference determining and adding operations on the pixel block at the right end of the focus detection area 12A in the horizontal direction, the difference determining and adding operations are repeated on the next row of pixel blocks directly below the previous row of pixel blocks by one pixel block in the vertical direction until completion of the determining operation on the pixel block at the right end of the focus detection area 12A in the horizontal direction and completion of the adding operation. Such difference determining and adding operations are repeated on all the pixel blocks in the focus detection area 12A. Subsequently, the same operations are performed on each of the remaining two focus detection areas 12B and 12C.

The sum of the differences ($a_{n+2}-a_n$) on each of the three focus detection areas 12A, 12B and 12C corresponds to the contrast value on that focus detection area at the current position of the focusing lens group L1. The contrast value can be represented by the following expression:

$$\sum_{n=0}^{max} (a_{n+2} - a_n)^2 \quad \text{[Expression 1]}$$

Figure 9:
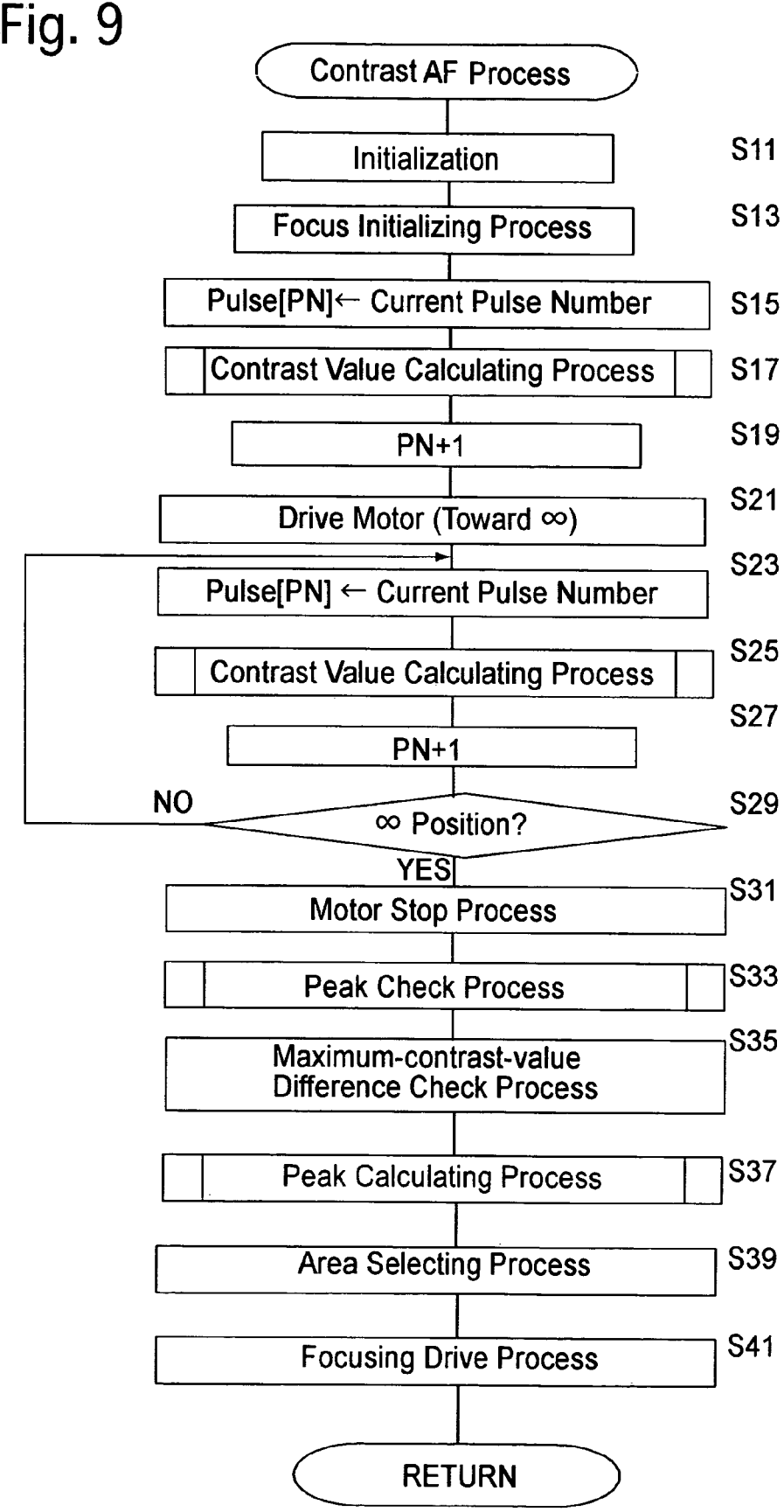
FIG. 9 is a flow chart showing a contrast AF process performed in the digital camera shown in FIG. 1.

In a contrast AF process (see FIG. 9), the CPU 15 performs an imaging operation with the image pickup device 11 while moving the focusing lens group L1 stepwise via the motor driver 23, the AF motor 25 and the lens drive mechanism 27, inputs the image signals from the three focus detection areas 12A, 12B and 12C to determine the contrast values on the three focus detection areas 12A, 12B and 12C, respectively, and stores the determined contrast values in an internal RAM of the CPU 15 as contrast data in the present embodiment of the digital camera. The CPU 15 repeats the contrast AF process while moving the focusing lens group L1 stepwise in the direction from one end to the other end within the range of movement of the focusing lens group L1, i.e., from the closest (shortest) focus position to the infinite focus position (position for bringing an object at infinity into focus).

In the present embodiment of the digital camera, the position of the focusing lens group L1 is detected by an origin sensor 27a with the closest (shortest) focus position of the focusing lens group L1 being taken as a point of origin, and is counted as the number of driving pulses from the point of origin. The driving pulses are defined as, e.g., pulses output from an encoder such as a photo-interrupter installed on the output shaft of the AF motor 25. Although several hundreds of pulses or more are usually necessary for driving the focusing lens group L1 from the closest (shortest) focus position to the infinite focus position, several pulses or several tens of pulses are only necessary for driving the focusing lens group L1 from the closest (shortest) focus position to the infinite focus position in the contrast AF process in the present embodiment of the digital camera since the focusing lens group L1 being moved stepwise. In addition, in the driving pulses used in the contrast AF process in the present embodiment of the digital camera, one driving pulse constitutes more than one pulse output from the aforementioned photo-interrupter.

Immediately after contrast data at each of the plurality of lens positions from the closest (shortest) focus position to the infinite focus position is obtained, contrast data at two adjacent lens positions of the focusing lens group L1 are compared with each other successively at a consecutive plurality of lens positions from the close range side to the long range side to determine whether the contrast value increases successively a predetermined number of times and subsequently decreases successively a predetermined number of times. More specifically, in the present embodiment of the digital camera, it is determined whether the contrast value increases two times in a row and subsequently decreases two times in a row on a group of five contrast data (obtained contrast values) at successive five lens positions from the close range side. If it is determined that the contrast value does not vary in such a manner, the same determining operation is performed on another group of five contrast data at successive five lens positions which are shifted toward the long range side by one lens position from the previous five lens positions.

Figure 4:
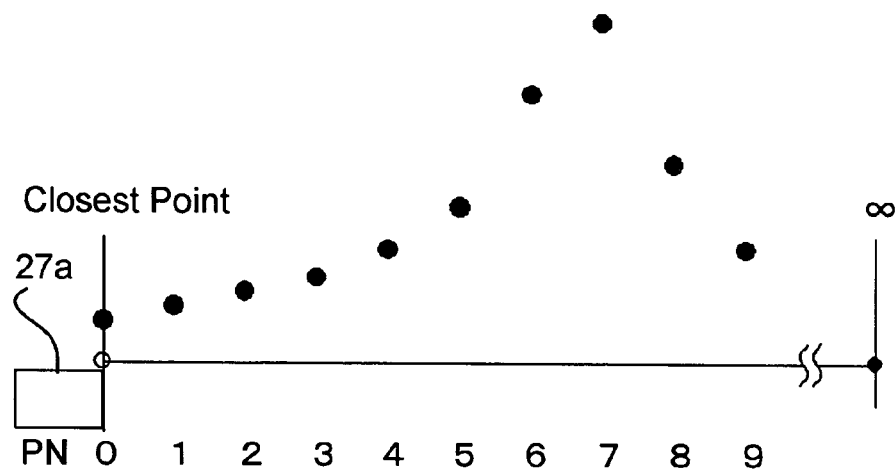
FIG. 4 is a graph showing a relationship between the position of a focusing lens, group and the contrast.
Figure 5:
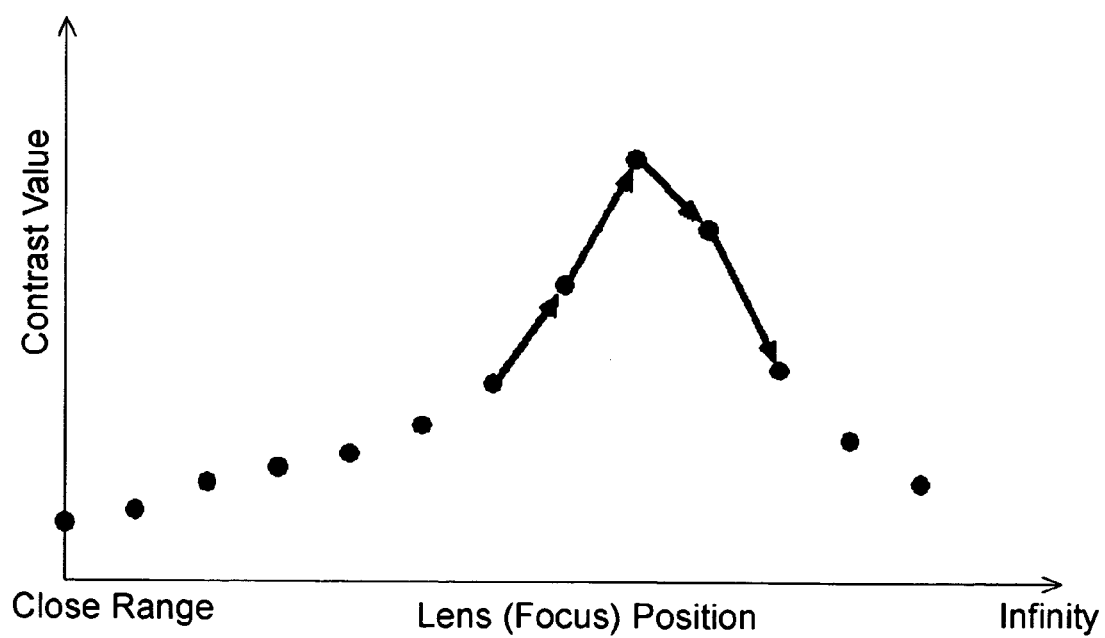
FIG. 5 is a graph illustrating the relationship between the position of the focusing lens group and the contrast in a contrast check process performed by the digital camera shown in FIG. 1.

FIGS. 4 and 5 each show a relationship between the position of the focusing lens group L1 and the contrast value. In these drawings, the horizontal axis designates the lens (focus) position, the vertical axis designates the contrast value, and the origin corresponds to the closest (shortest) focus position.

If it is determined that the contrast value increases two times in a row and subsequently decreases two times in a row (see FIG. 5), it is determined that a focused point exits at or immediately before or behind the lens position where a maximum contrast value is obtained. Additionally, the difference between the contrast value determined as the maximum contrast value and the minimum contrast value is determined to determine whether the difference is greater than a predetermined value (see FIG. 6A) or whether the difference is smaller than the predetermined value (see FIG. 6B). Furthermore, in order to obtain the maximum contrast value with a high degree of precision, the maximum contrast value is determined (calculated) by two linear approximation expressions (see FIGS. 7A through 7D) if it is determined that the difference is greater than the predetermined value, or by a quadratic approximation expression. (see FIG. 8) if it is determined that the difference is equal to or smaller than the predetermined value.

Figure 10:
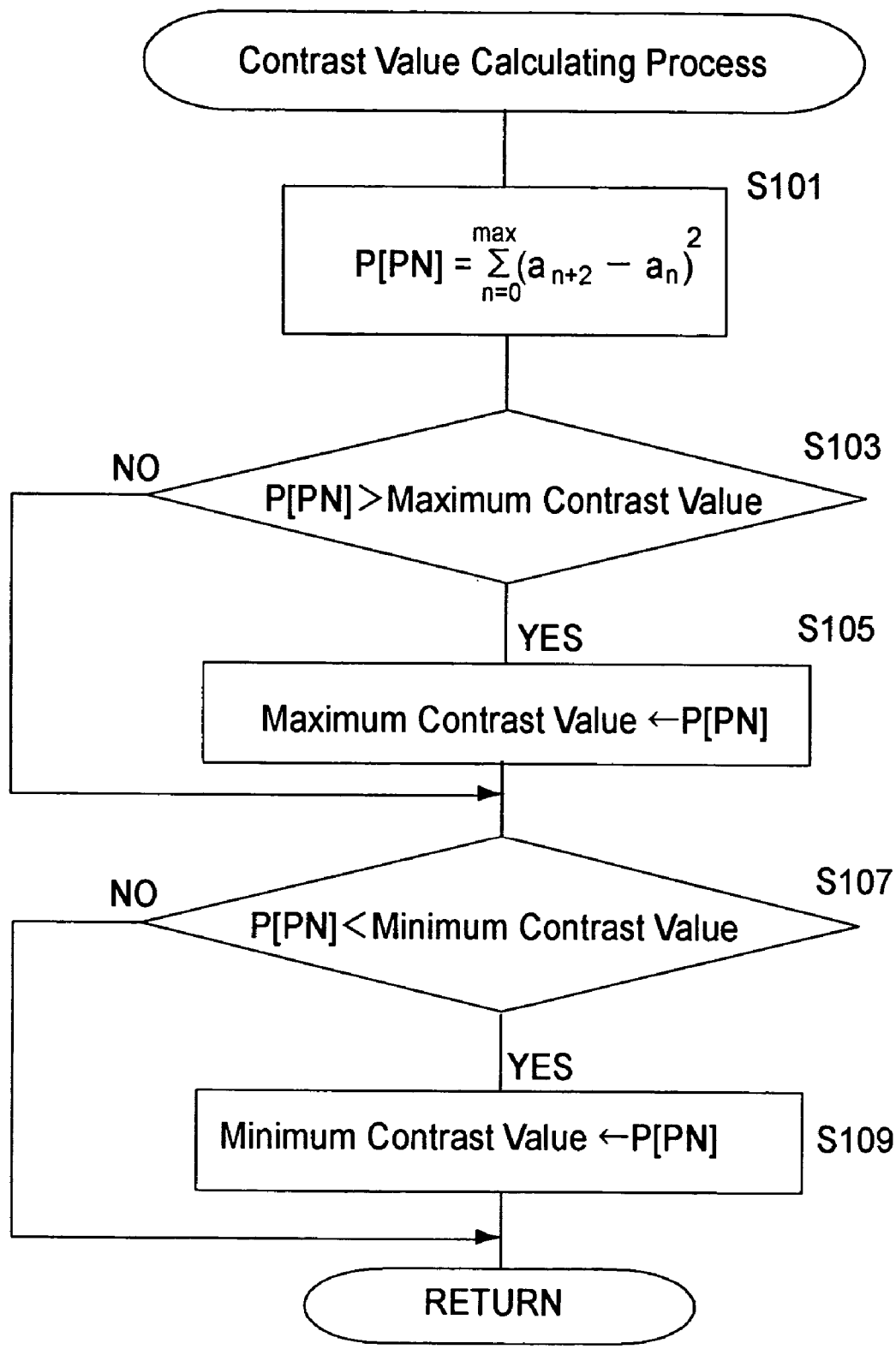
FIG. 10 is a flow chart showing a sub-routine "Contrast Value Calculating Process" performed in the contrast AF process shown in FIG. 9.

The contrast AF process performed in the present embodiment of the digital camera will be discussed in detail with reference to the flow charts shown in FIGS. 10, 11 and 12. In this particular embodiment, the contrast AF process shown in FIG. 9 commences immediately after the photometering switch SWS is turned ON, and is completed immediately after an in-focus state is obtained.

In the contrast AF process, firstly various variables and the like are initialized (step S11). For instance, each status is cleared, contrast values are cleared, a pulse number PN is initialized (PN=0), the maximum contrast value is set to zero, the minimum contrast value is set to FFFFFFFF, and the number of focus detection areas is selected according to the focal length of the photographing lens L in the present embodiment of the digital camera. The pulse number PN is a variable which is increased by 1 every time the focusing lens group L1 moves toward the infinite focus position by one pulse, wherein the pulse number PN is zero when the focusing lens group L1 is in the closest (shortest) focus position. Note that the aforementioned number of focus detection areas is selected from among predetermined different numbers according to the focal length of the photographing lens L to calculate the contrast value.

Upon completion of the initializing process at step S11, a focus initializing process is performed (step S13). In this process, the focusing lens group L1 is moved to one of the opposite ends of the moving range of the focusing lens group L1, specifically to the closest (shortest) focus position in this particular embodiment. Whether the focusing lens group L1 reaches the closest (shortest) focus position or not is detected with the origin sensor 27a.

Thereafter, a variable Pulse[PN] is set to the current pulse number PN (which is 0 (zero) at this stage, corresponding to the closest (shortest) focus position) (step S15), and subsequently a contrast value calculating process is performed (step S17). In the contrast value calculating process, a contrast value P[0] when the focusing lens group L1 is positioned at the closest (shortest) focus position is calculated in accordance with the image data input from the image pickup device 11, and each of the maximum contrast value and the minimum contrast value is replaced by new one.

Subsequently, the pulse number PN is increased by one (step S19), and the lens drive mechanism 27 is driven stepwise in a direction toward the infinite focus position (step S21). Namely, the focusing lens group L1 is made to start moving stepwise in a direction from the closest (shortest) focus position to the infinite focus position.

Subsequently, the variable Pulse[PN] is set to the current pulse number PN (step S23), and subsequently the contrast value calculating process is performed, in which the contrast value P[PN] is calculated in accordance with the image data input from the image pickup device 11 while each of the maximum contrast value and the minimum contrast value is replaced by new one (step S25). Thereafter, the pulse number PN is increased by one (step S27). Upon completion of the operation at step S27, it is determined whether the focusing lens group L1 has reached the infinite focus position (step S29). If it determined that the focusing lens group L1 has not yet reached the infinite focus position (if NO at step S29), control returns to step S23 so that the operations at steps S23 through S27 are repeated while the focusing lens group L1 is driven stepwise, in increments of one pulse, toward the infinite focus position.

Immediately after the focusing lens group L1 reaches the infinite focus position (if YES at step S29), the lens drive mechanism 27 is stopped (step S31). Subsequently, a peak check process (see FIG. 11) is performed in accordance with the contrast data obtained in the aforementioned loop process, i.e., the operations at steps S23 through S27 (step S33). Upon completion of the peak check process, a maximum-contrast-value difference check process is performed in which it is determined whether the difference between the first-highest maximum contrast value and the second-highest maximum contrast value is smaller than a predetermined value (step S35).

In the maximum-contrast-value difference check process, two or more maximum contrast values are detected, and it is determined that there is no maximum contrast value if the difference between the two maximum contrast values is smaller than a predetermined value because it is difficult to determine which of the (two or more) maximum contrast values is a real maximum contrast value.

Thereafter, a peak calculating process (see FIG. 12) is performed in which a precise peak of contrast is determined from an approximate (interpolation) calculation in accordance with contrast values P[PN] at a plurality of points between the selected two or more maximum contrast values (step S37). The aforementioned maximum-contrast-value difference check process at step S35 and the peak calculating process at step S37 are performed on each of the three focus detection areas 12A, 12B and 12C.

Subsequently, an area selecting process is performed (step S39). In the area selecting process, one of the three focus detection areas 12A, 12B and 12C in which the closest focus position of the focusing lens group L1 among the focus lens positions thereof respectively obtained from the focus detection areas 12A, 12B and 12C is selected as an in-focus area. Thereupon, the focusing lens group L1 is moved to the focus position of the selected focus detection area 12A, 12B or 12C to bring an object into focus (step S41), which ends the contrast AF process, and control returns to the step where the contrast AF process was called.

[Contrast Value Calculating Process]

The contrast value calculating process that is performed at steps S17 and S25 will be hereinafter discussed with reference to the flow chart shown in FIG. 10. Although the contrast value calculating process is performed on each of the three focus detection areas 12A, 12B and 12C, the contrast value calculating process that is represented by the flow chart shown in FIG. 10 will be discussed as a process performed only on one of the three focus detection areas 12A, 12B and 12C, specifically the center focus detection area 12A because the contrast value calculating process is repeated to be performed on each of the three focus detection areas 12A, 12B and 12C.

In the contrast value calculating process, firstly the contrast value P[PN] is determined from the following expression (step S101):

$$P[PN] = \sum_{n=0}^{max}(a_{n+2} - a_n)^2 \qquad \text{[Expression 2]}$$

Subsequently, the maximum contrast value P[PN] is determined from among the determined contrast values P[PN]

Figure 6A:
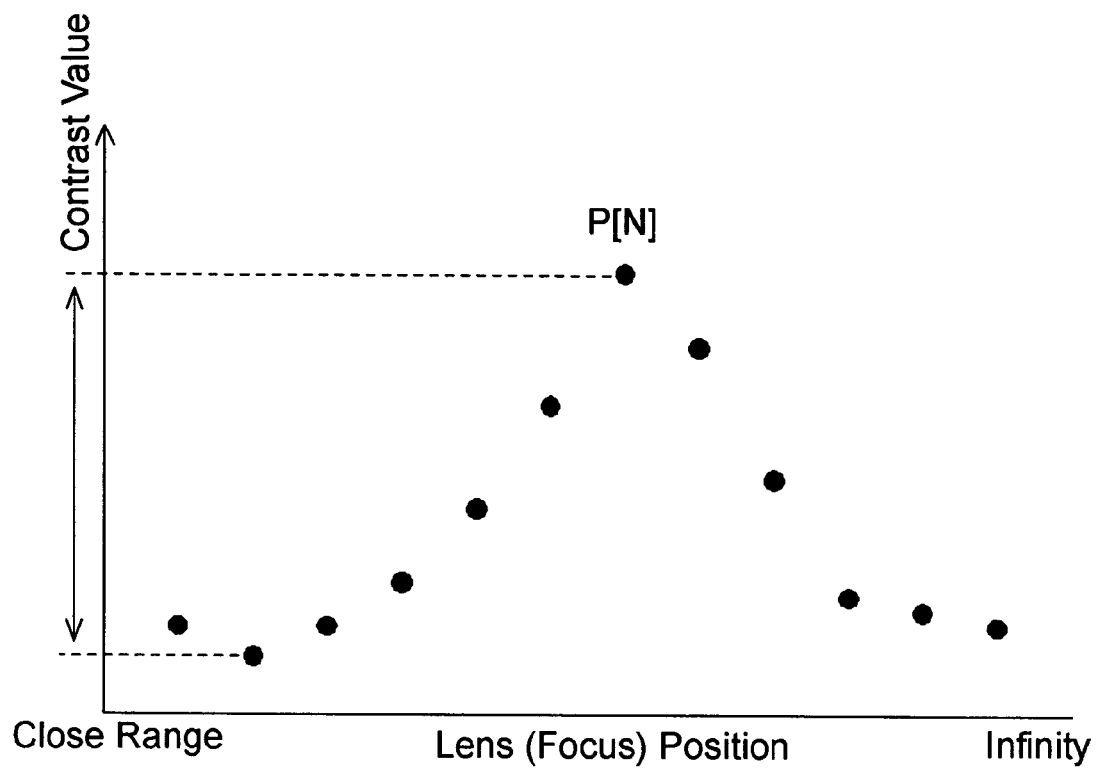
FIG. 6A is a graph similar, to that of FIG. 5 in the case where the contrast is not low.
Figure 6B:
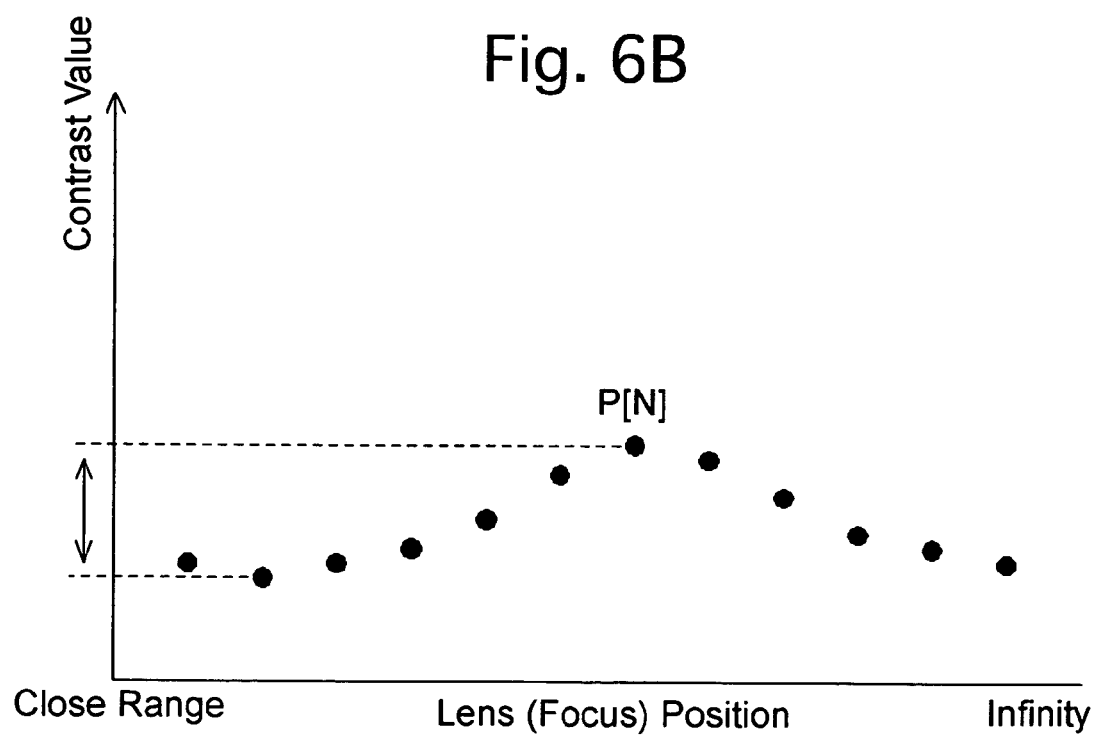
FIG. 6B is a graph similar to that of FIG. 5 in the case where the contrast is low.

(steps S103 and S105), and the minimum contrast value P[PN] is determined from among the determined contrast values P[PN] (step S107 and S109). If both the maximum contrast value P[PN] and the minimum contrast value P[PN.] are determined (if YES at each of steps S103 and S107), control returns to the contrast AF process. FIG. 6A shows the case where the difference between the maximum contrast value P[ PN] and the minimum contrast value P[PN] is great, while FIG. 6B shows the case where the difference between the maximum contrast value P[PN] and the minimum contrast value P[PN] is small

[Peak Check Process]

In the peak check process at step S33, a peak value of contrast is determined from the contrast values P[PN] which are obtained at stepwise positions, respectively, by moving the focusing lens group L1 stepwise. In the present embodiment of the digital camera, the contrast values P[PN] obtained at two adjacent lens positions are compared with each other on a group of five contrast values P[PN] obtained at consecutive five lens positions from the closest (shortest) focus position to the infinite focus position to determine whether the contrast value increases a first predetermined number of times in a row and subsequently decreases a second predetermined number of times in a row. Specifically, if it is determined that the contrast value increases two times in a row and subsequently decreases two times in a row, the maximum contrast value P[PN] is determined as a maximum contrast value (peak value of contrast).

Figure 11:
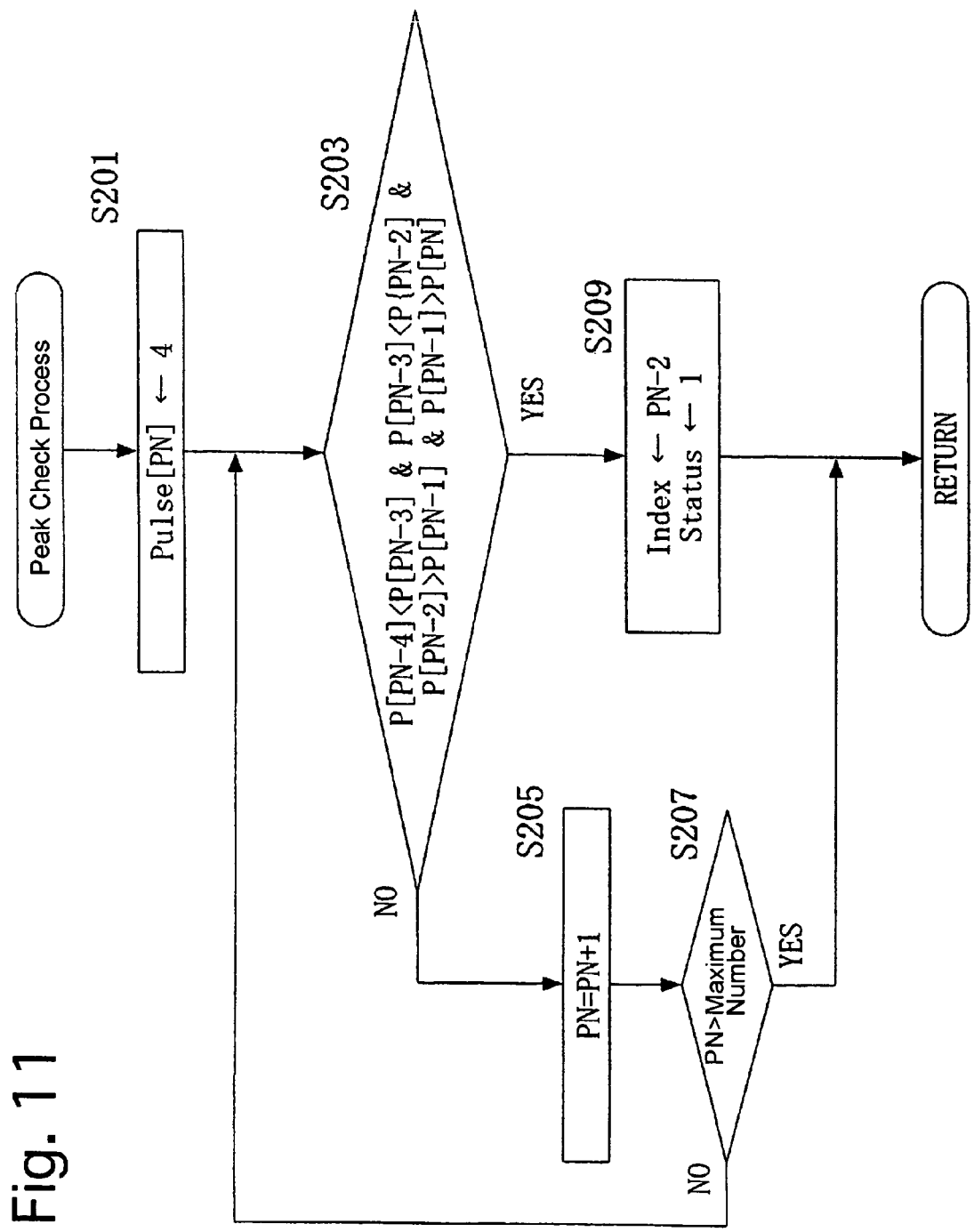
FIG. 11 is a flow chart showing a sub-routine "Peak Check Process" performed in the contrast AF process shown in FIG. 9.
Figure 12:
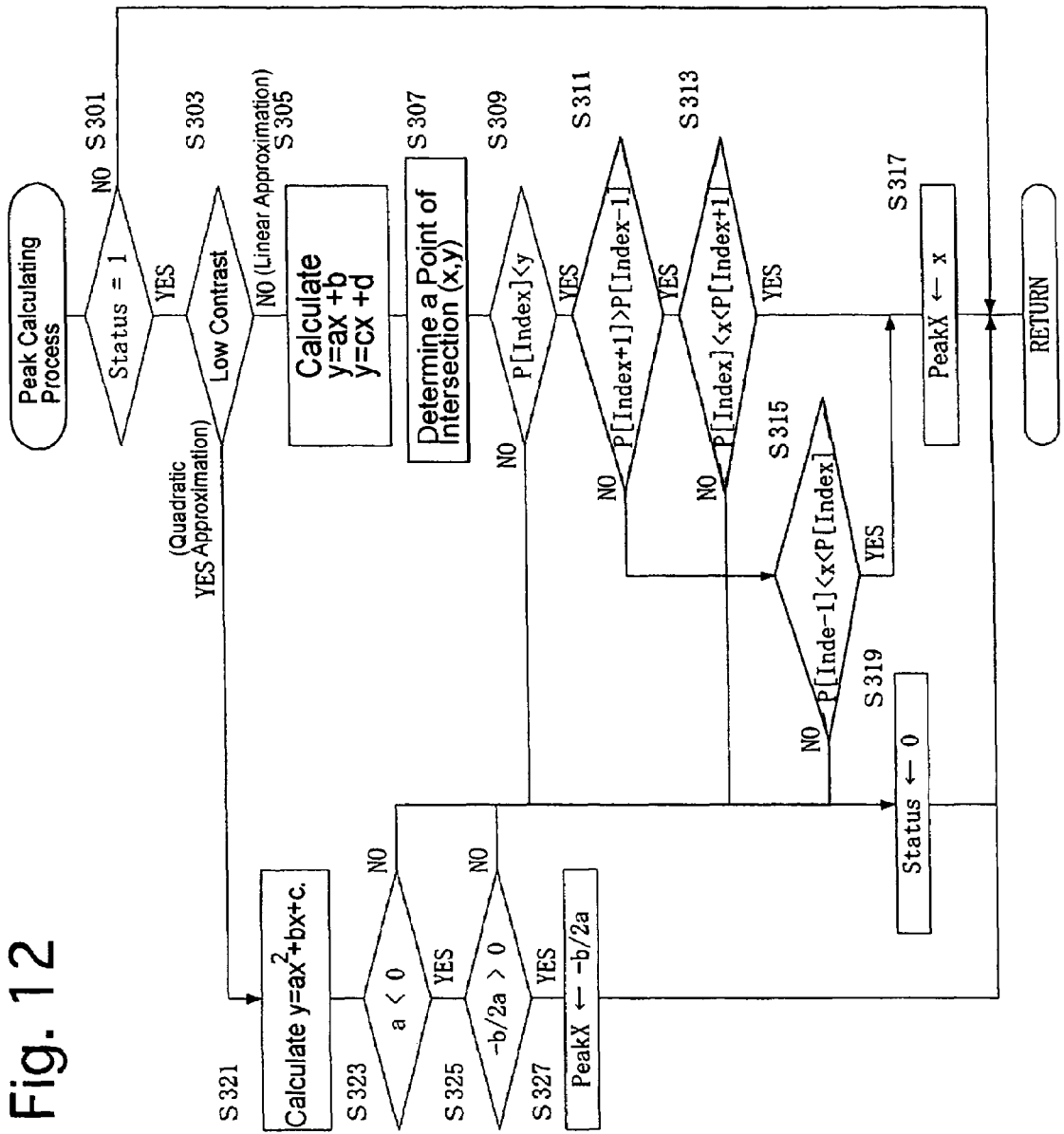
FIG. 12 is a flow chart showing a sub-routine "Peak Calculating Process" performed in the contrast AF process shown in FIG. 9.
Figure 13A:
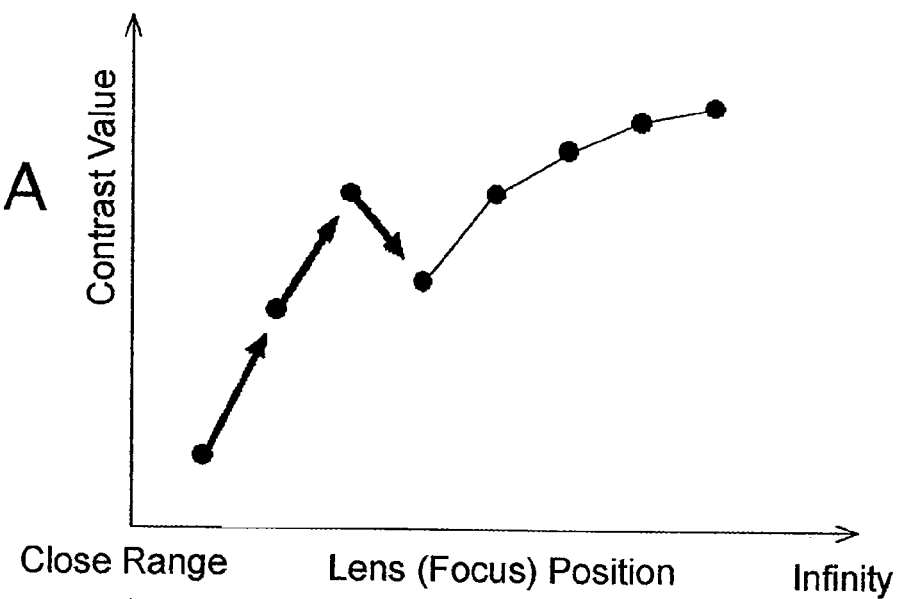
FIGS. 13A through 13C are graphs showing examples of a peak contrast being detected by a contrast check process according to a conventional contrast detection method.
Figure 13B:
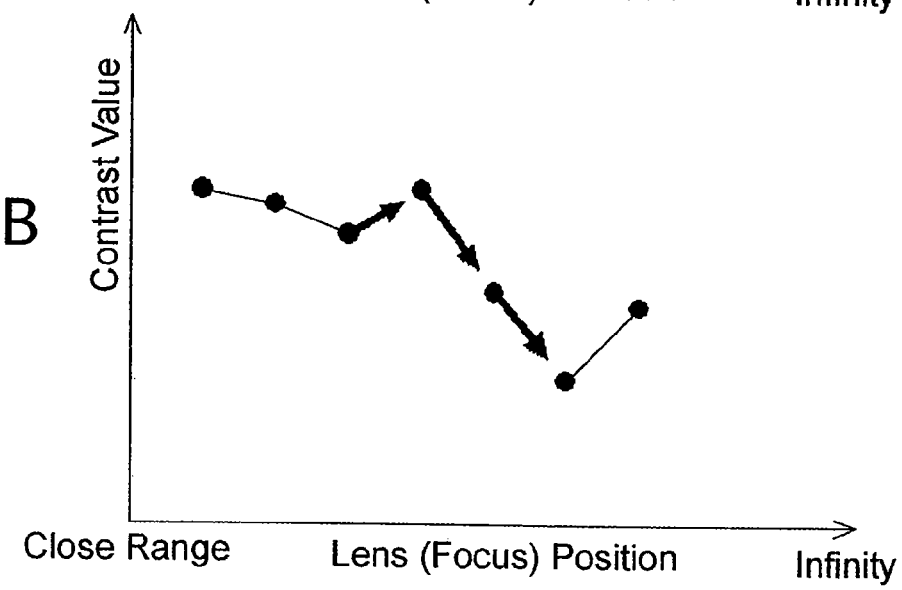
Figure 13C:
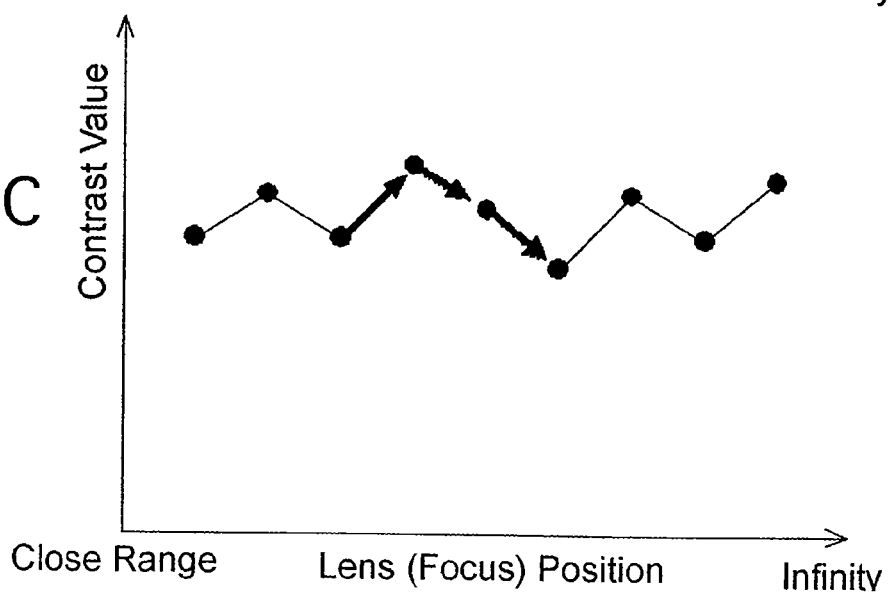

FIG. 11 shows a flow chart showing an embodiment of the peak check process. In the peak check process, firstly the pulse number PN is set to 4 (step S201), i.e., the peak check process is firstly performed on a group of five contrast values from the pulse number 0 (that corresponds to the closest (shortest) focus position) to the pulse number 4. Subsequently, it is determined whether the contrast value P[PN ] increases two times in a row and subsequently decreases two times in a row on the group of five contrast values P [PN-4], P[PN-3], P[PN-2], P[PN-1] and P[PN] (step S203). If it is determined that the contrast value P[PN] does not increase two times in a row and subsequently decrease two times in a row (if NO at step S203), the pulse number PN is increased by one (step S205), and it is determined whether the pulse number PN is greater than the maximum number (predetermined number) (step S207). If the pulse number PN is not greater than the maximum number (if NO at step S207), control returns to step S203 so that the peak check process is repeated. If the pulse number PN is greater than the maximum number (if YES at step S207), control returns to the contrast AF process.

If it is determined that the contrast value P[PN] increases two times in a row and subsequently decreases two times in a row (if YES at step S203), it is determined that the contrast value P[PN-2] is a maximum contrast value, a peak existence flag "Status" is set to 1 indicating that there is a peak value of contrast, and a peak point "Index" indicating a peak point (focus point) is set to the pulse number PN-2 in which the maximum contrast value P[PN-2] is obtained (step S209). Subsequently, control returns to the contrast AF process. A peak value of contrast is determined by the above described peak check process.

[Peak Calculating Process]

The peak calculating process that is performed at step S37 will be hereinafter discussed in detail in accordance with the flow chart shown in FIG. 12 with reference to the graphs shown in FIGS. 7A through 7D and 8. Each of FIGS. 7A through 7D and 8 shows plotted values, in which the horizontal axis (x-axis) and the vertical axis (y-axis) designate the lens (focus) position and the contrast value, respectively.

In linear approximation, a linear approximation expression (straight line) which passes through the point of a maximum contrast value (detected maximum contrast value) among the detected contrast values and the point of another contrast value obtained on the close range side or the infinite range side, and another linear approximation expression (straight line) which passes through the points of two contrast values obtained on the infinite range side or the close range side with respect to the point of the peak value of contrast, are determined to obtain the point of intersection between the straight lines of these two linear approximation expressions. The x-coordinate of the point of intersection of the two straight lines is determined as a focus lens position of the focusing lens group (focused focal point) if the value of the y-coordinate (determined maximum contrast value) of the point of intersection of the two straight lines is greater than the detected maximum contrast value.

In quadratic approximation, a quadratic approximation expression which passes a plurality of contrast values including a maximum contrast value (detected maximum contrast value) among the detected contrast values is determined, and the maximum value (determined maximum contrast value) of the quadratic curve thereof is determined, and the x-coordinate at which this maximum value is obtained is determined as a focus lens position of the focusing lens group (focused focal point).

In the present embodiment of the digital camera, a precise peak value of contrast is determined by approximate calculation using the five contrast values P[PN-4], P[PN-3], P[PN-2], P[PN-1] and P[PN] that are positioned with the contrast value P[PN-2] being positioned at the center of theses five contrast values between the closest focus position and the infinite focus position. In the present embodiment of the digital camera, a contrast value which is assumed to be the actual peak value of contrast is calculated by linear approximation if the difference between the contrast value determined as the maximum contrast value and the minimum contrast value is equal to or greater than a predetermined value, i.e., in the case of high contrast (normal object to be photographed), and is calculated by approximation calculation using quadratic approximation expression if the difference between the contrast value determined as the maximum contrast value and the minimum contrast value is smaller than the predetermined value, i.e., in the case of low contrast (low-contrast object to be photographed).

In the peak calculating process, firstly it is determined whether the peak existence flag "Status" is 1, i.e., whether there is a peak value of contrast (step S301). If the peak existence flag "Status" is not 1 (if NO at step S301), control returns to the contrast AF process. If the peak existence flag "Status" is 1 (if YES at step S301), it is determined whether the contrast of an object to be photographed is low based on the difference between the contrast value determined as the maximum contrast value and the minimum contrast value (step S303).

[In the Case of not a Low-Contrast Object]

If not a low-contrast object (if NO at step S303), a normal process which includes operations at and after step S305 is performed. In this normal process, regarding a straight line (Y=ax+b) which passes through the points of two contrast values including a peak value of contrast and another straight line (Y=cx+d) which passes through the points of two contrast values including no peak value, gradients a and c and intersections b and d of the two straight lines are determined (step S305). Subsequently, the x and y coordinates of the point of intersection of the two straight lines respectively determined by the two equations (Y=ax+b and Y=cx+d) are determined (step S307). The y-coordinate of the point of intersection is determined as a determined peak value of contrast y, while the x-coordinate of the intersection is determined as a determined contrast-peak lens position x.

Subsequently, it is determined whether the peak value of contrast P[Index] is smaller than the determined peak value of contrast y (step S309). If the peak value of contrast P[Index] is smaller than the determined peak value of contrast y (if YES at step S309), operations at and after step S311 are performed. If the peak value of contrast P[Index] is not smaller than the determined peak value of contrast y (if NO at step S309), the peak existence flag "Status" is set to 0 indicating that there is no peak value of contrast (step S319), and control returns to the contrast AF process. When the peak value of contrast P[Index] is smaller than the determined peak value of contrast y, i.e., when the determined peak value of contrast y is greater than the peak value of contrast P[Index], the determined peak value of contrast y is assumed to be a more precise peak value (see FIG. 7C), whereas the reliability of the determined peak value of contrast y is low when the peak value of contrast P[Index] is greater than the determined peak value of contrast y (see FIG. 7D).

If the peak value of contrast P[Index] is smaller than the determined peak value of contrast y (if YES at step S309), the contrast value P[Index−1] and the contrast value P[Index+1] which are positioned on respective sides of the peak value of contrast P[Index] are compared with each other to determine whether the contrast value P[Index+1] is greater than the contrast value P[Index−1] (step S311). In the present embodiment of the digital camera, the peak point "Index" is PN-2, and accordingly, the contrast value P[Index−1] is the contrast value P[PN-3] while the contrast value P[Index+1] is the contrast value P[PN-1].

In the Case of "P[PN-3]<P[PN-1]"

It is determined at step S311 whether the contrast value P[Index+1], which is positioned closer to the long range side than the peak value of contrast P[Index], is greater than the contrast value P[Index−1], which is positioned closer to the close range side than the peak value of contrast P[Index], and it is determined at step S313 whether an approximate peak point x is greater than the peak value of contrast P[Index] and smaller than the contrast value P[Index+1], which is positioned closer to the long range side than the peak value of contrast P[Index]. If the contrast value P[Index+1] is greater than the contrast value P[Index−1] (if YES at step S311) and further if the approximate peak point x is greater than the peak value of contrast P[Index] and smaller than the contrast value P[Index+1] (if YES at step S313), a peak position PeakX is set to the approximate peak point x (step S317) and control returns to the contrast AF process. FIGS. 7A and 7C correspond to this case.

If the contrast value P[Index+1] is greater than the contrast value P[Index−1] (if YES at step S311) and further if the approximate peak point x is not greater than the peak value of contrast P[Index] or smaller than the contrast value P[Index+1] (if NO at step S313), the peak existence flag "Status" is set to 0 indicating that there is no peak value of contrast (step S319), and control returns to the contrast AF process. FIG. 7D corresponds to this case.

In the Case of "P[PN-3]>P[PN-1]"

If the contrast value P[Index+1] is not greater than the contrast value P[Index−1] (if NO at step S311), control proceeds to step S315 at which it is determined whether the approximate peak point x is greater than the contrast value P[Index−1], which is positioned closer to the close range side than the peak value of contrast P[Index], and smaller than the peak value of contrast P[Index]. If the approximate peak point x is greater than the contrast value P[Index−1] and smaller than the peak value of contrast P[Index] (if YES at step S315), the peak position PeakX is set to the approximate peak point x (step S317), and control returns to the contrast AF process. FIG. 7B corresponds to this case.

If the contrast value P[Index+1] is not greater than the contrast value P[Index−1] (if NO at step S311), and further if the approximate peak point x is not greater than the contrast value P[Index−1] or smaller than the peak value of contrast P[Index] (if NO at step S315), the peak existence flag "Status" is set to 0 (step S319) and control returns to the contrast AF process.

[In the Case of a Low-Contrast Object]

If a low-contrast object (if YES at step S303), a peak value of contrast y is determined from the following quadratic approximation expression (step S321):

$$y=ax^2+bx+c$$

Subsequently, it is determined whether the coefficient "a" in the above expression is smaller than zero (step S323). This expression becomes a quadratic curve curved upwardly in the case where the coefficient "a" is smaller than zero (a<0), a primary expression in the case where the coefficient "a" is equal to zero (a=0), and a quadratic curve curved downwardly in the case where the coefficient "a" is greater than zero (a>0). Accordingly, if it is determined that the coefficient "a" is not smaller than zero (if NO at step S323), the quadratic approximation expression does not become a quadratic curve curved upwardly and therefore has no peak value of contrast, so that the peak existence flag "Status" is set to 0 (step S319), and control returns to the contrast AF process.

Figure 8:
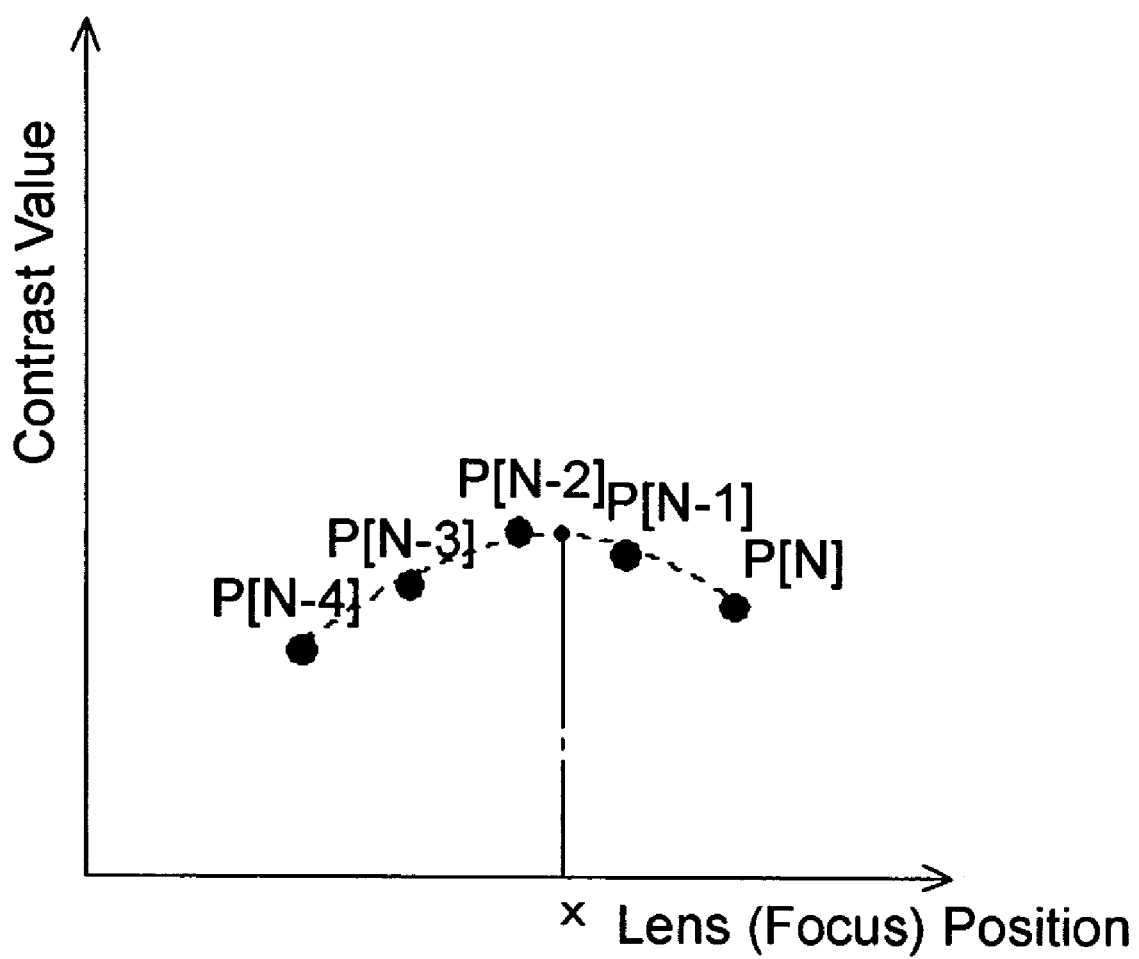
FIG. 8 shows a graph illustrating the linear approximation of a peak value of contrast in the case of a low-contrast object.

If it is determined that the coefficient "a" is smaller than zero (if YES at step S323), it is determined whether −b/2a is greater than zero (−b/2a>0) (step S325). If −b/2a is greater than zero (if YES at step S325), the peak of the quadratic curve of the quadratic approximation expression, i.e., a peak value of contrast, exits within the range of movement of the focusing lens group L1. However, if −b/2a is equal to or smaller than zero, the peak of the quadratic curve of the quadratic approximation expression exits outside the range of movement of the focusing lens group L1. Accordingly, If −b/2a is greater than zero (if YES at step S325), the peak value of contrast P[Index] is set to the value of the x-coordinate −b/2a (step S327), and control returns to the contrast AF process. FIG. 8 corresponds to this case. If −b/2a is not greater than zero (if NO at step S325), there is no peak value of contrast, and accordingly, the peak existence flag "Status" is set to 0 (step S319), and control returns to the contrast AF process.

As can be understood from the above description, according to the present invention, a more precise focused focal point can be detected because a more precise peak value of contrast is determined by linear approximation in the case of a normal object, and a more precise peak value of contrast is determined by quadratic approximation expression in the case of a low-contrast object, the contrast value of which is difficult to be determined by linear approximation, thus making it possible to bring even a low-contrast object, which is difficult to be brought into focus by a conventional focus detection apparatus which adopts a contrast detection method, into focus with precision.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A focus detection apparatus for detecting a focus state of an object image in accordance with a contrast of said object image, said focus detection apparatus comprising:
 a lens drive mechanism for moving a focusing lens group of a photographing lens system within a predetermined range of movement; and
 a controller for detecting a contrast value of said object image at each of a plurality of different positions of said focusing lens group and for moving said focusing lens group, via said lens drive mechanism, in a direction from one end to the other end of opposite ends of said range of movement of said focusing lens group,
 wherein said controller calculates a difference between a maximum contrast value and a minimum contrast value of said contrast values detected at said different positions of said focusing lens group,
 wherein said controller compares contrast values at two adjacent positions of said focusing lens group, in said direction from said one end to said other end of said range of movement of said focusing lens group, to determine whether said contrast value increases successively a predetermined number of times and subsequently decreases successively a predetermined number of times,
 wherein said controller detects a maximum contrast value when said controller determines that said contrast value increases successively said predetermined number of times and subsequently decreases successively said predetermined number of times,
 wherein said controller calculates said maximum contrast value by calculating a point of intersection between straight lines of two linear approximation expressions when said difference is one of equal to or greater than a predetermined value, one of said two straight lines passing through points of at least two adjacent contrast values on one of opposite sides of said maximum contrast value, the other of said two straight lines passing through points of at least another two adjacent contrast values on the other of said opposite sides of said maximum contrast value, and
 wherein said controller calculates said maximum contrast value from a maximum value of a quadratic approximation expression which passes through a plurality of contrast values including said maximum contrast value when said difference is smaller than said predetermined value.

2. The focus detection apparatus according to claim 1, wherein said controller compares said calculated maximum contrast value with said detected maximum contrast value to determine whether said calculated maximum contrast value is greater than said detected maximum contrast value, and
 wherein, when said controller determines that said calculated maximum contrast value is greater than said detected maximum contrast value, said controller determines that a position of said focusing lens group at which said calculated maximum contrast value is obtained corresponds to a focused focal point, and moves said focusing lens group to said position of said focusing lens group.

3. The focus detection apparatus according to claim 1, wherein said controller determines a greater contrast value between said detected maximum contrast value and said calculated maximum contrast value as a maximum contrast value corresponding to a focused focal point.

4. The focus detection apparatus according to claim 1, wherein said lens drive mechanism moves focusing lens group stepwise when said lens drive mechanism is driven by a motor.

5. The focus detection apparatus according to claim 1, wherein said contrast of said object image is measured by an image pickup device.

6. A focus detection method for detecting a focus state of an object image in accordance with a contrast of the object image, said focus detection method comprising:
 detecting a contrast value of the object image at each of a plurality of different positions of a focusing lens group within a predetermined range of movement, while moving the focusing lens group in a direction from one to the other of opposite ends of the range of movement of the focusing lens group,
 calculating a difference between a maximum contrast value and a minimum contrast value among the contrast values detected at the different positions of the focusing lens group,
 comparing contrast values at two adjacent positions of the focusing lens group with each other in the direction from the one end to the other end of the range of movement of the focusing lens group to determine whether the contrast value increases successively a predetermined number of times and subsequently decreases successively a predetermined number of times,
 detecting a maximum contrast value when it is determined that the contrast value increases successively the predetermined number of times and subsequently decreases successively the predetermined number of times,
 calculating the maximum contrast value by calculating a point of intersection between straight lines of two linear approximation expressions when the difference is one of equal to or greater than a predetermined value, one of the two straight lines passing through points of at least two adjacent contrast values on one of opposite sides of the maximum contrast value, the other of the two straight lines passing through points of at least another two adjacent contrast values on the other of the opposite sides of the maximum contrast value, and
 calculating the maximum contrast value from a maximum value of a quadratic approximation expression which passes through a plurality of contrast values including the maximum contrast value when the difference is smaller than said predetermined value.

7. The focus detection method according to claim 6, further comprising:
 comparing the calculated maximum contrast value with the detected maximum contrast value to determine whether the calculated maximum contrast value is greater than the detected maximum contrast value, and determining that a position of the focusing lens group where the calculated maximum contrast value is obtained corresponds to a focused focal point, and moving the focusing lens group to the position of the focusing lens group, wherein, when it is determined that the calculated maximum contrast value is greater than the detected maximum contrast value.

8. The focus detection method according to claim 6, further comprising:
 determining a greater contrast value between the detected maximum contrast value and the calculated maximum contrast value as a maximum contrast value corresponding to a focused focal point.

9. The focus detection method according to claim 6, further comprising:
 moving the focusing lens group stepwise via a lens drive mechanism when the lens drive mechanism is driven by a motor.

* * * * *